United States Patent
Caspi et al.

(10) Patent No.: US 7,925,698 B2
(45) Date of Patent: Apr. 12, 2011

(54) APPARATUS AND METHOD FOR A SYNCHRONIZED MOBILE COMMUNICATION CLIENT

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1041 days.

(21) Appl. No.: 10/922,648

(22) Filed: Aug. 18, 2004

(65) Prior Publication Data
US 2006/0041686 A1    Feb. 23, 2006

(51) Int. Cl.
    *G06F 15/16*    (2006.01)
(52) U.S. Cl. ......... 709/204; 709/202; 709/205; 709/248
(58) Field of Classification Search ................. 709/248; 455/416, 466; 379/142.15; 715/751
    See application file for complete search history.

(56) References Cited

U.S. PATENT DOCUMENTS

| | | | |
|---|---|---|---|
| 5,729,687 A * | 3/1998 | Rothrock et al. | 709/204 |
| 5,996,002 A * | 11/1999 | Katsurabayashi et al. | 709/204 |
| 6,108,687 A * | 8/2000 | Craig | 709/203 |
| 6,640,241 B1 * | 10/2003 | Ozzie et al. | 709/204 |
| 6,654,032 B1 * | 11/2003 | Zhu et al. | 715/753 |
| 6,728,753 B1 * | 4/2004 | Parasnis et al. | 709/203 |
| 6,820,055 B2 * | 11/2004 | Saindon et al. | 704/235 |
| 6,865,599 B2 * | 3/2005 | Zhang | 709/218 |
| 7,051,071 B2 * | 5/2006 | Stewart et al. | 709/204 |
| 7,167,898 B2 * | 1/2007 | Sato et al. | 709/204 |
| 7,251,675 B1 * | 7/2007 | Kamakura et al. | 709/204 |
| 7,337,325 B2 * | 2/2008 | Ikegami et al. | 713/182 |
| 2002/0103864 A1 * | 8/2002 | Rodman et al. | 709/204 |
| 2003/0014488 A1 * | 1/2003 | Dalal et al. | 709/204 |
| 2003/0172160 A9 * | 9/2003 | Widegren et al. | 709/226 |
| 2003/0191805 A1 * | 10/2003 | Seymour et al. | 709/204 |
| 2004/0008635 A1 * | 1/2004 | Nelson et al. | 370/260 |
| 2004/0158586 A1 * | 8/2004 | Tsai | 707/200 |
| 2005/0097169 A1 * | 5/2005 | Mukherjee et al. | 709/204 |
| 2005/0278424 A1 * | 12/2005 | White | 709/204 |
| 2006/0020665 A1 * | 1/2006 | Hagale et al. | 709/204 |

\* cited by examiner

*Primary Examiner* — John Follansbee
*Assistant Examiner* — Madhu Woolcock

(57) ABSTRACT

Some embodiments provide a system for synchronizing participant copies of presentation data during a collaboration session. A presenter/server controlling the session sends synchronization commands when a change in state of the presentation data occurs. The synchronization commands can be received by a mobile communication device and then forwarded to the participant computer system where it is used to synchronize the copy of the presentation data with the presenter/server.

73 Claims, 5 Drawing Sheets

APPARATUS AND METHOD FOR A
SYNCHRONIZED MOBILE
COMMUNICATION CLIENT

CROSS-REFERENCE TO RELATED APPLICATIONS

The present application is related to a commonly-assigned, co-pending U.S. patent application Ser. No. 10/922,655, entitled "Apparatus and Method for Enhanced Synchronization Using an IMS Server" which is being filed concurrently herewith.

BACKGROUND

1. Field

This application relates generally to conferencing and collaboration.

2. Related Art

Data collaboration sessions typically require a participant's computer to utilize and thus be connected to the Internet or a company intranet. Data collaboration sessions often involve one of the participants to present data such as a PowerPoint™ slide or images in an active manner while other participants view the presented data in a passive manner. In some cases, the collaboration session is presented to all of the participants by a server application or by other automated means. Technologies such as OpenScape™, LiveMeeting™, NetMeeting™ and WebEx™ can assist with launching and managing such data collaboration sessions, but require the passive and active participants to be connected to a data network where they can access a high-bandwidth connection (such as DSL (Digital Subscriber Line or even a modern connection). However, often participants will be operating remotely where a high-bandwidth connection or any data connection for that matter is not readily available. Such participants may have available a computer system such as a laptop and some other messaging device such as a cellular telephone which can be utilized for voice/text interactivity, but not have a high-bandwidth data connection available.

There is thus a need for enhancing remote participation in a data collaboration session without a data connection of any sort.

BRIEF DESCRIPTION OF THE DRAWINGS

Some embodiments are illustrated in the accompanying figures, in which like reference numerals designate like parts, and wherein.

DETAILED DESCRIPTION

Some embodiments provide an apparatus and method for remote synchronization in a data collaboration session using a computing device and a mobile communications device. In some embodiments, the computing device is a laptop, PDA (Personal Digital Assistant) or desktop computer. In some embodiments, the mobile communication device is cellular telephone. In other embodiments, the computing device and mobile communication device capabilities may be integrated into a single device such as in a PDA equipped with cellular network connectivity. The data collaboration session is configured and established by a presenter/server.

The invention, in various embodiments, is implemented by taking advantage of the fact that in data collaboration sessions, copies of the data to be presented are often available to participants prior to the commencement of the session. For instance, in a conference call involving the use of slides, the slides may be e-mailed to conference participants prior to the conference taking place such that the copies are "local" to the participants. The presentation data (such as slides) may change state (move forward to the next slide) at the presenter/server during the collaboration session. The presenter/server sends synchronization commands, representing this state change, to the participants. In some embodiments of the invention, the data, signaling or messaging channel of a cellular/wireless network is utilized to send/receive synchronization commands and feedback. In at least some embodiments, a mobile communications device such as a cellular telephone is connected via a data interface to a computing device such as laptop to transfer synchronization commands or feedback between the mobile communication device and the computing device. In some devices where a mobile communication capability is integrated with a computing or data processing capable device (used for viewing the presentation data) the need for an explicit interface is eliminated.

The synchronization commands would be sent to the mobile communication device. The synchronization commands are in turn transferred to a participant's computer system ("synchronization destination") via an interface which couples the mobile communication device thereto. The synchronization destination uses a control application or applet to cause the local copy of the presentation data to be synchronized in state with the presenter/server. Synchronization commands maybe forwarded to multiple synchronization destinations, if desired. Likewise, synchronization feedback, such as a mouse click or other data can be forwarded from the participant to the presenter/server using the same or similar pathway.

Figure 1:
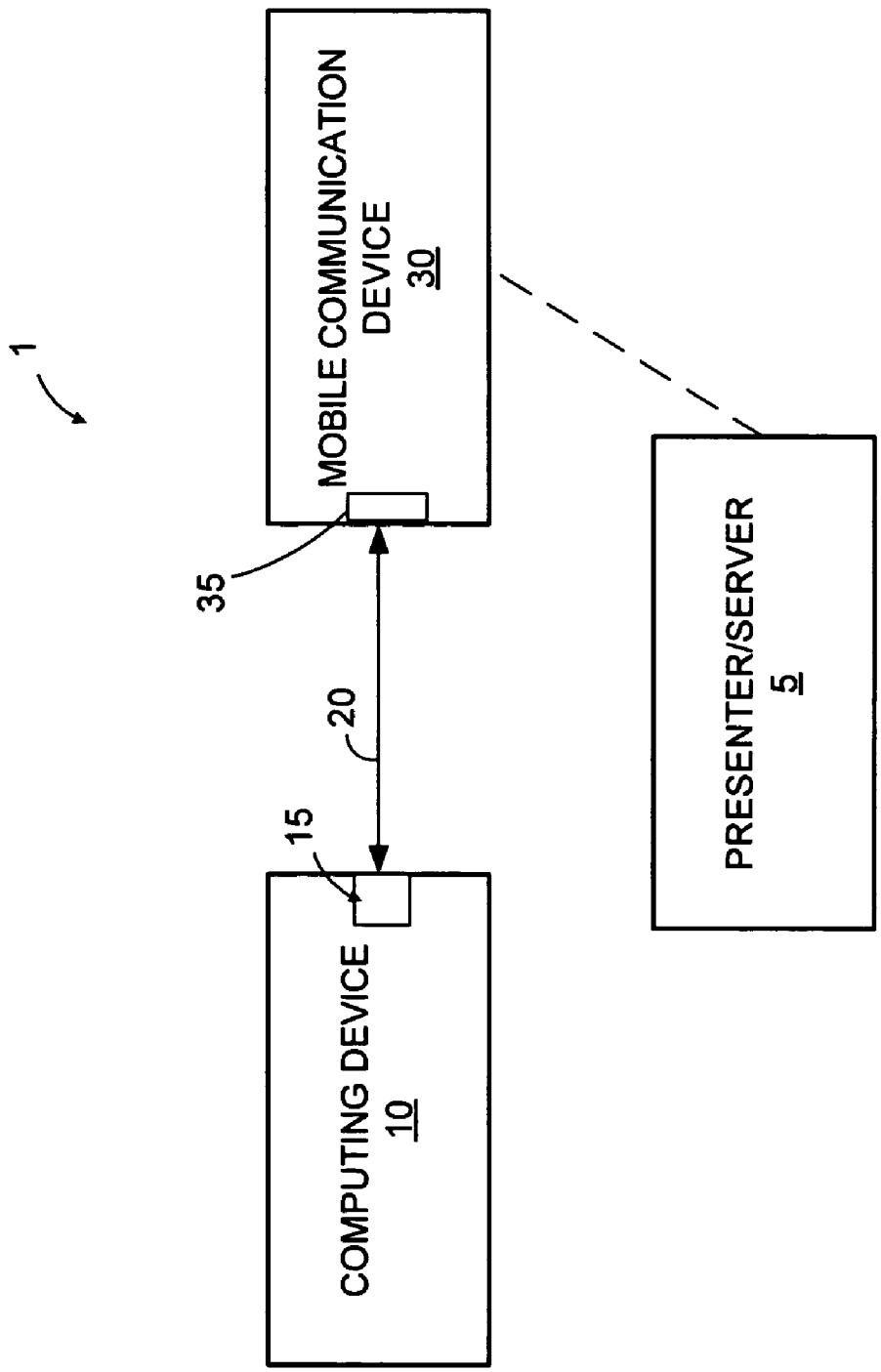
FIG. 1 is a block diagram of a system according to some embodiments of the invention.

FIG. 1 is a block diagram of a system according to some embodiments. System 1 includes presenter/server 5, computing device 10, pathway 20 and mobile communication device 30. The computing device 10 includes a port 15 for communicating or coupling with other devices. Likewise, mobile communication device 30 includes a port 35. One or more participants of the collaboration session would have a computing device 10 and mobile communication device 30 or a device integrating both of these. Some embodiments are generally described below with respect to FIG. 1, with more detailed descriptions thereof to follow.

Presenter/server 5 may be a computer system or similar device which is capable of running a collaboration application such as OpenScape™ or WebEx™. The collaboration session is initiated by a user (or automated task) configuring the collaboration session on the presenter/server 5 and may include definitions/locations of the participants, timetables, device associations for participants, and so forth. The collaboration session may also include voice conferencing and/or video conferencing which can be configured as desired. This may include the presenter/server 5 utilizing an associated telephony device such as land-line telephone or cellular telephone. The establishment of a typical conferencing/collaboration session is well-known in the art. For each participant in the session, his/her mobile communication device 30 or other telephony device (not shown) may be utilized for providing interactivity during the call/session including, for instance, voice interactivity with presenter/server 5. In accordance with the invention, the mobile communication device 30 would be associated with a particular participant or participants, and more precisely, a "synchronization destination" where the presentation data is available to be viewed. There may be multiple synchronization destinations, each supporting one participant or a group of participants. The data is configured with an identification of the master presenter (presenter/server 5), a file name corresponding to the presentation data and identification of the synchronization destination(s).

The presenter/server 5 uses a secondary application such as an OpenScape® (a communications suite developed by Siemens AG) service which enables the collaboration application to send synchronization commands and receive synchronization feedback to/from synchronization destinations. The secondary application communicates synchronization information (commands and feedback) with an IMS Server (IP Multimedia Subsystem) or other similar mobile application server. The IMS Server is an application server developed by Siemens AG for transacting data with mobile communication devices. The mobile application server communicates synchronization information to/from mobile communication device 30.

The mobile communication device 30 can be an analog cellular telephone and/or a digital cellular telephone, or satellite-based mobile phone or any wireless communication device, such as a Blackberry™. Examples of such devices include CDMA (Code Division Multiple Access) based devices, TDMA (Time Division Multiple Access), W-CDMA (Wideband CDMA) or GSM (Global System for Mobile communications). In some embodiments, the mobile communication device 30 may be a 2G, 2.5G, 3G, or 3gPP enabled device. The mobile communication device 30 typically has a data channel (such as GPRS (General Packet Radio Service) or messaging channel (such as an SMS (Short Message Service) channel) and may be capable of transacting data with other networks using WAP (Wireless Application Protocol) and the like. Using one or more of these capabilities, the mobile communication device can receive a synchronization command or send synchronization feedback to the presenter/server 5.

Mobile communication device 30 would utilize port 35 or a suitable signaling system to transact data with computing device 10 over pathway 20. For instance, mobile communication device 30 may include a Bluetooth port or IrDA (Infrared Data Association) port which allows communication with computing device 10 in a wireless fashion. In such cases, the pathway 20 may simply be air. In other embodiments, USB (Universal Serial Bus) or similar wired connectivity can be used such that pathway 20 is a cable, wire or pins. In either case, the port 35 and a port 15 on the computing device 10 would be compatible and/or interoperable. For instance, both port 15 and port 35 could be IrDA ports with the interface 20 being air. The establishment of a communication or data session between computing device 10 and mobile communication device 30 using ports 15 and 35 is well-known in the art, and will not be described further. The type of ports/interfaces available are numerous and examples given are not intended to be limiting.

In yet other embodiments of the invention, the mobile communication device 30 may be integrated as a function of computing device 10 or vice-a-versa. An example of such an integrated device is a PDA with cell phone capability built-in, such as a Handspring Treo communicator. In such embodiments, the need for an external interface between computing device 10 and mobile communication device 30 is eliminated since data can be transferred via some internal mechanism.

In accordance with various embodiments of the invention, computing device 10 would be utilized by a participant in a conference call and/or data collaboration session to view presentation data such as slides. For this purpose, the computing device 10 may run one or more personal application programs such as PowerPoint™ which load the presentation data and make it available to the participant. It is assumed that the computing device 10 does not have access to or need not utilize, even if available, a high-speed packet data network connection such as an IP (Internet Protocol) connection. Such connections are traditionally made available using a data connection service such as DSL, T1, analog modems, ISDN (Integrated Services Digital Network) and so on. It is further assumed that the presentation data for the session/call is available offline to the computing device 10 (and associated personal application(s)). This may be achieved by downloading the presentation data to the computing device 10 when such a high-speed data connection is available or by accessing previously stored presentation data from removable media such as a floppy, CD (Compact Disc) or DVD (Digital Video Disc), or a removable hard disk and the like. Utilizing one or more embodiments of the invention, the participant(s) of the call/session would view the presentation data on computing device 10 in synchronization with the remotely located presenter/server 5 without benefit of a traditional "video conferencing" or computer-based conferencing capability or even, a high-speed packet data connection.

As mentioned, to take advantage of the invention, the presenter/server 5 would not need to be connected in a high-speed data connection to computing device 10. The computing device 10 would instead receive synchronization commands from and send synchronization feedback to the mobile communication device 30 using the associated ports 15 and 35 and pathway 20. Exemplary synchronization commands include messages indicating the current slide number, or file name of data being presented, page numbers, mouse coordinates, screen coordinates, and the like. Using the synchronization commands, the computing device 10, with the aid of an applet ("synchronization application"), would use the synchronization commands forwarded by the mobile communication device 30 to automatically or manually control the personal productivity application. As a result, the presentation data shown by the personal productivity application would be synchronized with the presenter/server 5. This synchronization could be achieved in real-time (granting network latency). Synchronization feedback would likewise be forwarded to the mobile communication device 30 and then onto the presenter/server 5 using the same described mechanism.

The computing device 10 could be a PDA such as a PalmPilot or handheld computer running an operating system such as Windows CE and the like. In such embodiments, computing device 10 may be running smaller footprint personal productivity applications such as DataViz Documents to Go and the like. The slides or presentation data could be loaded onto the computing device 10 at some time prior to the start of the collaboration session so that the computing device 10 can participate remotely.

In other embodiments of the invention, duplex or multiplex collaboration is also possible, where any or all of the participants can change state of the presentation during the session. In such embodiments, synchronization feedback can be used to alter the state of the presentation of the presenter/server 5, or alternatively, could pass control to one of the other participants to become the presenter/server. Such embodiments can be used where there is more that one participant is taking turns presenting data or is doing so on an ad hoc basis. For instance, a participant using computing device 10 could point to a slide using their cursor. The collaboration client could relay this cursor location (by, for instance, screen coordinates) as synchronization feedback from the synchronization destination (computing device 10) to the mobile communication device 30. The mobile communication device 30 could then forward this cursor location to other participants and/or to the presenter/server 5.

Figure 2:
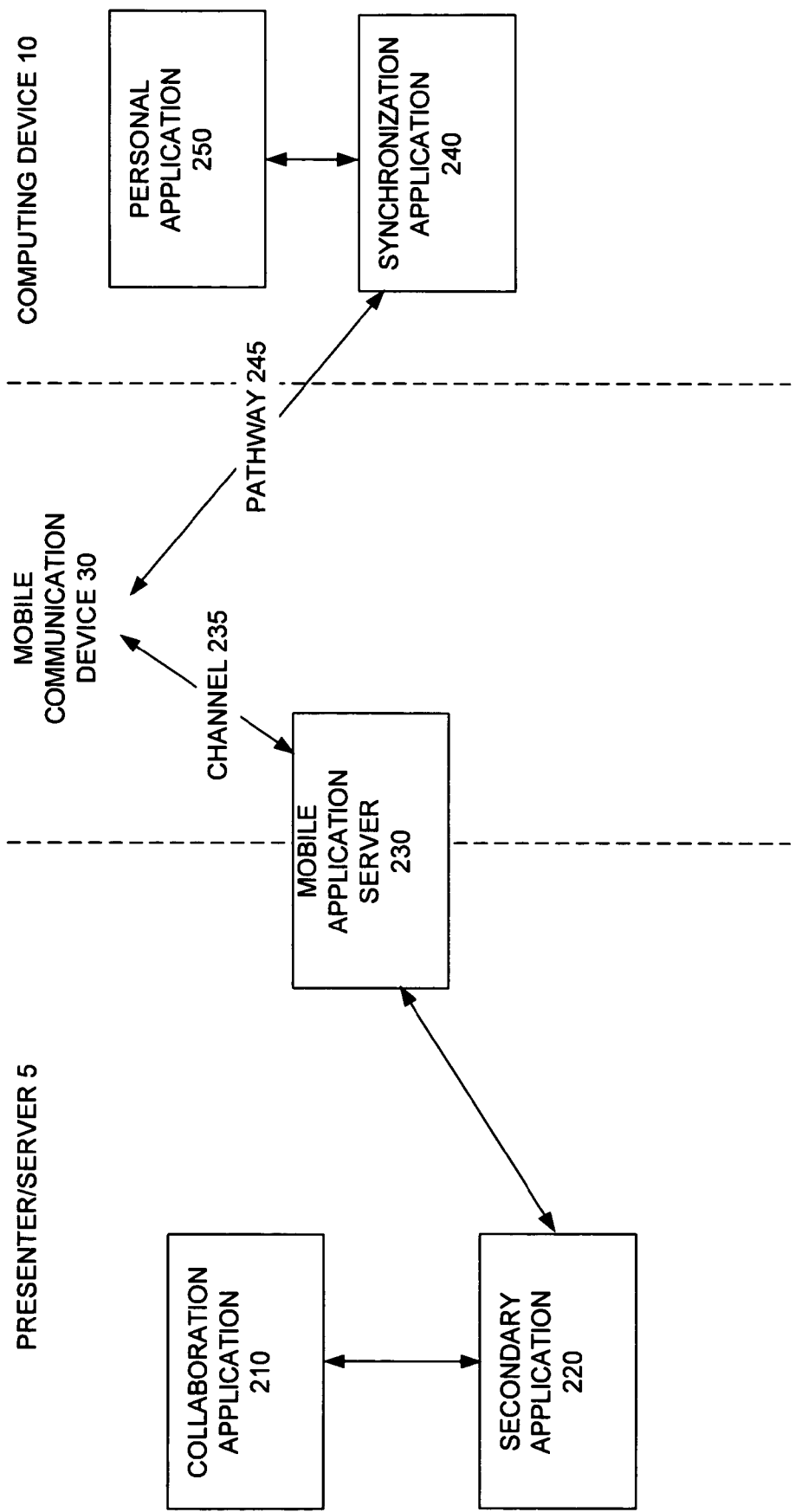
FIG. 2 is an application diagram according to some embodiments of the invention.

FIG. 2 is an application diagram according to some embodiments of the invention. The presenter/server 5 runs a collaboration application 210 and a secondary application 220. The collaboration application 210 is conferencing and/or call management software (which may include whiteboarding and other features) which establishes and manages a data collaboration session and/or conference call. Collaboration application 210 may include software such as OpenScape®, LiveMeeting™, NetMeeting™ and WebEx™. Collaboration application 210 is launched either automatically (through task scheduling or similar means) or by a user having access to presenter/server 5. The collaboration application 210 configures and initiates a session with a plurality of participants. Each of the participants will have computing device 10 and some of the participants may also have a mobile communication device 30. Those participants who do not have access to a high-speed network connection can use their mobile communication device 30 as a gateway to send/receive synchronization information (such as commands and feedback). If collaboration application 210 does not provide the service already, a secondary application 220 such as an applet or plug-in is utilized to assist in communicating synchronization information with mobile communication device 30. OpenScape® can be configured, for instance, with a service that can connect to a mobile application server 230. Mobile application server 230 is an application server which may be present in or accessible by a base station of a cellular network or other communications relaying and networking center. One example is IMS (IP Multimedia Subsystem). IMS is an application server, developed by Siemens AG, that was designed to communicate data to 3 Gpp cellular telephones. IMS allows interworking and communication amongst IP-based networks, cellular technologies (such as GSM) and wired telephony technologies (such as PSTN) and thus enables a rich variety of data (such as voice, voice-over-IP, video, video-over-IP, instant messages, text, files, and applications to be passed from one to another). The mobile application server 230 may also be available to presenter/server 5 via a data network such as the Internet.

The mobile application server 230 can communicate over some network which can access a channel 235 which can transact messages and data with one ore mobile communication devices 30. Channel 235 may include a cellular network, satellite network or access to the above networks though another network such as a packet-switched or circuit-switched network or a gateway or a combination of these, as needed. Channel 235 is intended also to represent cellular base station, base station sub-system, switches, relays, repeaters and the like which are in the network path terminating at mobile communication device 30. Channel 235 would also include provisioning for data channels and messaging channels (such as SMS) which are provided in addition to the voice provisioning for mobile communication device 30. The configuration of such networks is well-known in the art. Channel 235 is used to communicate synchronization information from mobile application server 230 to/from mobile communication device 30.

Synchronization commands received by mobile communication device 30 are sent over a pathway 245 to a synchronization application 240 running on computing device 10. Pathway 245 includes wireless (such as IrDA or Bluetooth) or wired interfaces (such as USB) between mobile communication device 30 and computing device 10. Devices 10 and 30 would have physical ports as well which can handle this interfacing in a compatible or interoperable fashion (e.g. ports 15 and 35 of FIG. 1). As mentioned above, if mobile communication device 30 and computing device 10 were integrated into one hardware platform, the need for an explicit external pathway would be eliminated. Synchronization application 240 would be configured to receive/send data over the physical port which communicates on pathway 245. Personal application 250 includes applications such as browsers, Adobe Acrobat, PowerPoint, Microsoft Word, Excel and the like which enable a user to view/edit/save/print presentation data. As discussed above, it is assumed that the presentation data is available for access by personal application 250 in a manner such that it does not need to be downloaded/accessed in real-time from a network location, but is readily available on computing device 10 or some device directly connected to computing device 10 as a peripheral thereof. Synchronization application 240 can utilize synchronization commands it receives from pathway 245 to direct the personal application 250 to perform some action changing the state in the local copy of the presentation data to match that of the presentation data in the presenter/server 5. For instance, the synchronization command may direct the personal application 250 to forward ahead one page or slide in the presentation data. Synchronization application 240 can also be used to collect and forward synchronization feedback from personal application 250 or the user of computing device 10. This feedback may involve mouse or cursor movements, and the like. Such feedback can be sent via pathway 245 through the mobile communication device 30 onto mobile application server 230 and back to the presenter/server 5 and/or to other participants of the session through secondary application 220. As mentioned above, complex multi-presenter collaboration session can also be enabled using the synchronization feedback mechanism. Synchronization feedback from participants other than the presenter/sever 5 can be sent from their synchronization destinations (computing devices 10) through their mobile communication devices 30 to other participants and/or presenter/server 5. This would enable different entities to hand-off state control of the presentation data to each other. Such state information from participants may have to be routed through the collaboration application 210 which has the full participant list for the session. The collaboration application 210 could modify the feedback into a synchronization command which could then be issued to all other participants.

Figure 3:
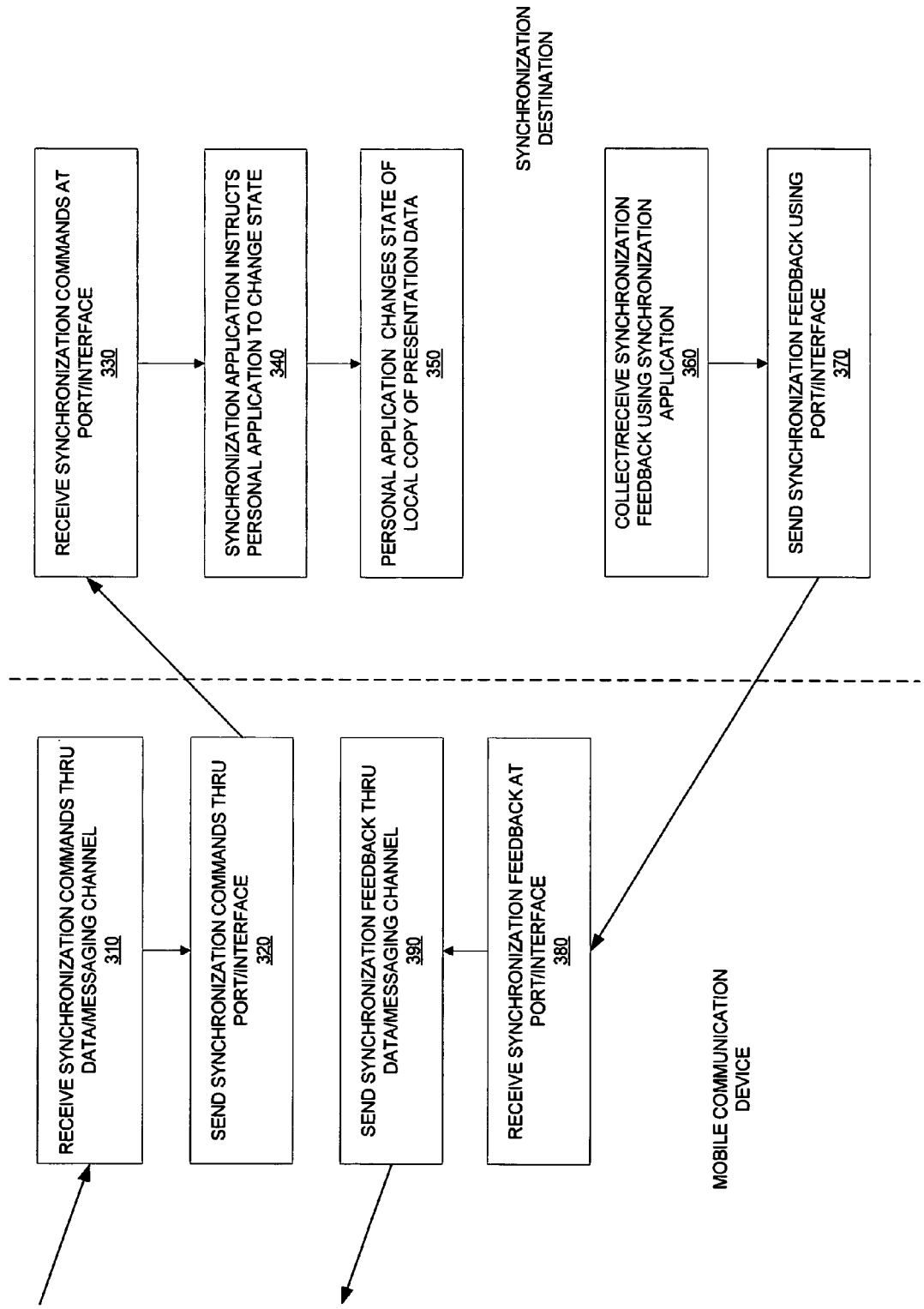
FIG. 3 is a flowchart of synchronization according to some embodiments of the invention.

FIG. 3 illustrates a process flow for sending/receiving synchronization information at a participant having a mobile communication device and a synchronization destination according to at least one embodiment of the invention. The synchronization destination may be, for instance, a laptop and the mobile communication device a cellular telephone. Presentation data such as a PowerPoint slide presentation could be e-mailed to the user of the synchronization destination while that user has or is accessing a network connection or could be available using removable media. This allows the presentation data to be available locally so that it need not be downloaded during the collaboration session. The overall flow of sending/receiving synchronization information is set forth in FIG. 3 of the related patent application entitled "Apparatus and Method for Enhanced Synchronization Using an IMS Server" identified above.

Once the collaboration session is started, synchronization commands can be forwarding to participants that have a mobile communication device thru the data/messaging channel or signaling channel accessible by the mobile communication device (block 310). For instance, if the presenter/server is advancing forward to another page or document in the presentation, a synchronization command that indicates this change in state can be sent to all or some of the participants. The mobile communication device then sends the synchronization commands thru a port/interface for local (rather than wide network) communications (block 320). Examples of such ports include wired ports such as USB or wireless interfaces such as Bluetooth and IrDA.

The synchronization commands are then received at a compatible/interoperable port/interface on the synchronization destination (block 330). For instance, if the commands were sent from an IrDA port on the mobile communication device, then they could be received at another IrDA port available on the synchronization destination. Using these commands, the synchronization application running on the synchronization destination then instructs the personal application (also running on the synchronization destination) to change the state of the presentation data (block 340). An example of such a state change would be moving ahead to the next slide of a presentation. The state of the local copy of the presentation data is then changed by the personal application (block 350) so that it is synchronized with the state of the presentation data at a remote presenter/server which issued the synchronization command(s).

Likewise, according to some embodiments of the invention, synchronization feedback input to the synchronization destination can be collected by the synchronization application at any time during pendency of the collaboration session (block 360). Such feedback may include messages via keystrokes, mouse or cursor movement and the like. This enables collaboration sessions to interactive so that participants can be active rather than passive. The synchronization feedback can be sent using a local communications port/interface (block 370) like that used in receiving synchronization commands. The feedback is received/collected by the mobile communication device's port/interface which is compatible with the port/interface of the synchronization destination (block 380). The feedback is sent out via the mobile communication device's data and/or messaging channels (block 390). This feedback can be used by the presenter/server to utilize, act upon or simply acknowledge conduct by the participant.

The process blocks shown in FIG. 3 may be occurring many times during the collaboration session and may affect many different participants, particular those whose synchronization destinations do not have high speed or high bandwidth data access. Furthermore, in some embodiments of the invention, a participant can become a temporary presenter/server (if control is passed to that participant by the presenter/server or by another participant) by using the synchronization feedback path to send changes of state occurring to its local copy of presentation data. Such state change information may be sent to the original presenter/server so that it can be issued as a synchronization command to all other participants.

Figure 4:
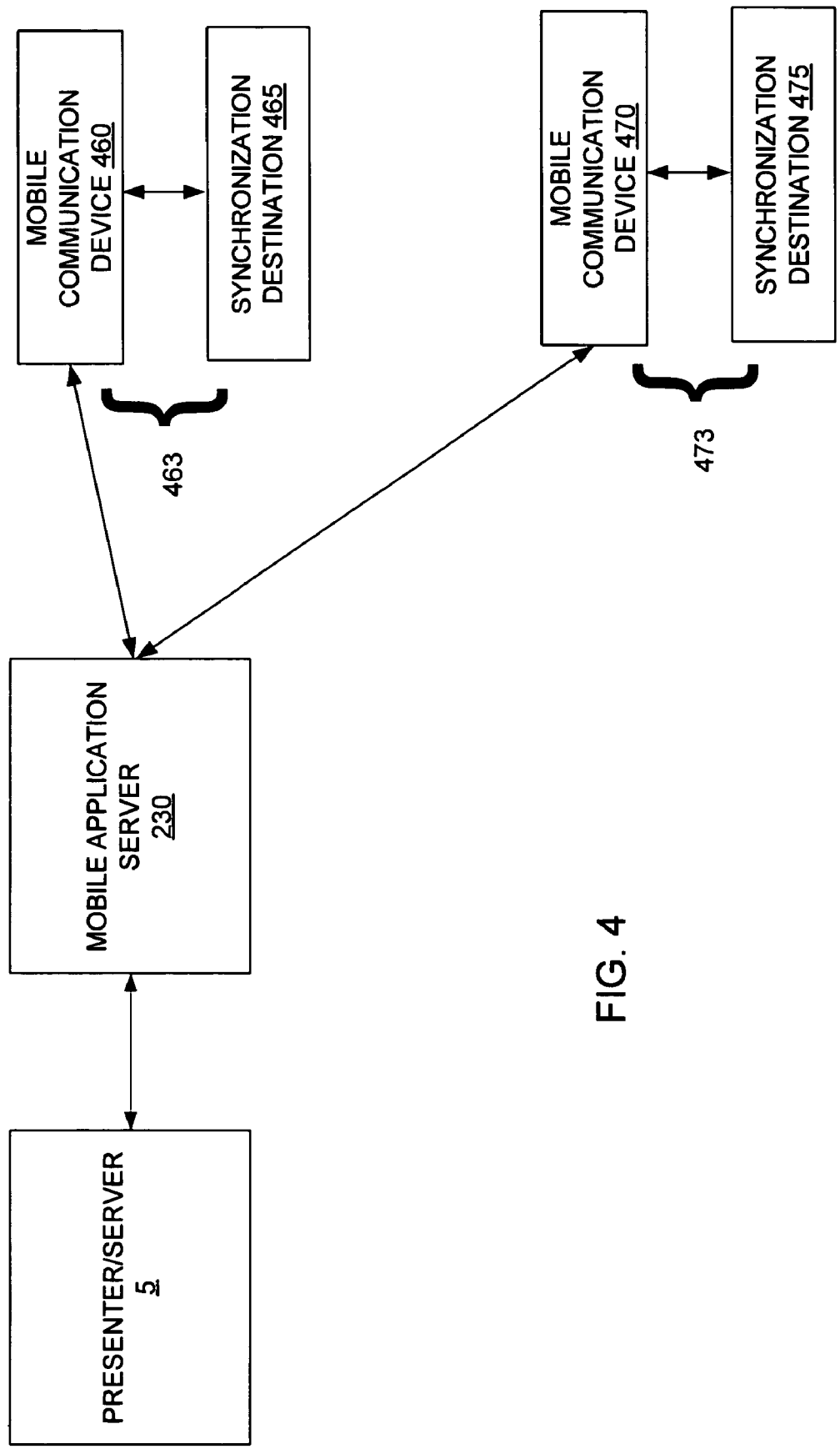
FIG. 4 is a block diagram of broadcast synchronization according to some embodiments of the invention.

FIG. 4 illustrates multi-participant synchronization according to at least one embodiment of the invention. In a collaboration session, there are typically many participants. FIG. 4 shows two such participants, both of which do not have high-speed network access. In accordance with the invention, presentation data which is previously sent to the participants can be synchronized with the presenter/server (who manages the collaboration session). A first participant 463 has an associated mobile communication device 460 and synchronization destination 465 with which it can communicate. Likewise, the collaboration session supports a second participant 473 which also has an associated mobile communication device 470 and synchronization destination 475 with which it can communicate. Though only two participants are shown, this is by way of illustration only. Any number of participants may be involved in the collaboration session, some of whom have devices like synchronization destination 465 and mobile communication device 460 and others of whom may have a high-speed network connection with which they can receive presentation data in real-time from presenter/server 5.

Once the collaboration session has begun, the presentation data at the presenter/server 5 may change state. For instance, the state change can involve moving from one page/file of the presentation data and the next. This state change can be reflected nearly instantaneously for participants viewing the presentation data from the presenter/server 5 over a high speed data connection. However, for other participants, such as 463 and 473 shown in FIG. 4, the invention provides a method and apparatus for synchronizing local copies of the presentation data with the state of the presentation data at the presenter/server 5. Once a state change occurs at presenter/server 5, a synchronization command is sent to mobile application server 230. Mobile application server 230 can then broadcast or be used as a gateway to forward this synchronization command to mobile communication devices 460 and 470, and hence, to both of the participants 463 and 473, respectively. The mobile communication device 460 forwards this synchronization command to synchronization destination 465. Likewise, mobile communication device 470 forwards the same or similar synchronization command to synchronization destination 475. The synchronization destinations 465 and 475 use this synchronization command to effectuate a state change in a local copy of the presentation data. Thus, the state of the presentation data local to the synchronization destinations 465 and 475 is "synchronized" with the state of presentation data at presenter/server 5. For instance, a change in state may involve a slideshow presentation moving ahead 5 slides. The synchronization command may represent this state change with a indication to "move ahead 5 slides" or merely with an indication of the updated new slide number.

The synchronization commands can be sent from mobile communication device 460 to synchronization destination 465 using a local communications port/interface available, compatible or interoperable on both device 460 and destination 465. For instance, synchronization commands could be sent over a Bluetooth port available on both device 460 and destination 465. Likewise, synchronization feedback could be sent from synchronization destination 465 to mobile communication device 460 using the same or similar mechanism. Such communication of synchronization would also occur between synchronization destination 475 and mobile communication device 470 belonging to participant 473.

As mentioned earlier, it is possible for a multi-participant presentation as well as collaboration. For instance, if the presenter/server 5 and participants 463 and 473 were all to present different data or portions of the same data during the session, this could be handled using the synchronization feedback mechanism discussed above. For example, presenter/server 5 could start the collaboration session by presenting the first 5 slides of a 15 slide presentation. When that first part of the presentation is concluded, presenter/server 5 can pass temporary session control to participant 463. Participant 463 can utilize their local copy of presentation data to present the next 5 slides (slides 6-10). The change of state at participant 463 (for instance moving ahead from slide 6 to 7) can be communicated in the way of synchronization feedback from synchronization destination 465 to mobile communication device 460. Mobile communication device 460 could, in some embodiments, send this feedback to presenter/server 5 via mobile application server 230 to presenter/server 5/Presenter/server 5 can then issue synchronization commands to itself and to other participants such as participant 473. Participant 473 can then change state of their local copy of presentation data on synchronization destination 475 to match that of participant 463. Once participant 463 concludes their part of presentation with say slide 10, then control can be passed to participant 473 to present the next 5 slides and so on in a like manner.

In other embodiments of the invention, if a participant and associated devices list were available to participant 463, then presenter/server 5 could be bypassed entirely. It would be preferable in most situations to have state control of the presentation data rest with only one participant or the presenter/server 5 at one time. The use of a presenter/server 5 as an intermediary in such cases maintains orderly transition from one participant to another and eliminates the need for all participants to be responsible for and have available complicated collaboration information and session management duties.

Figure 5:
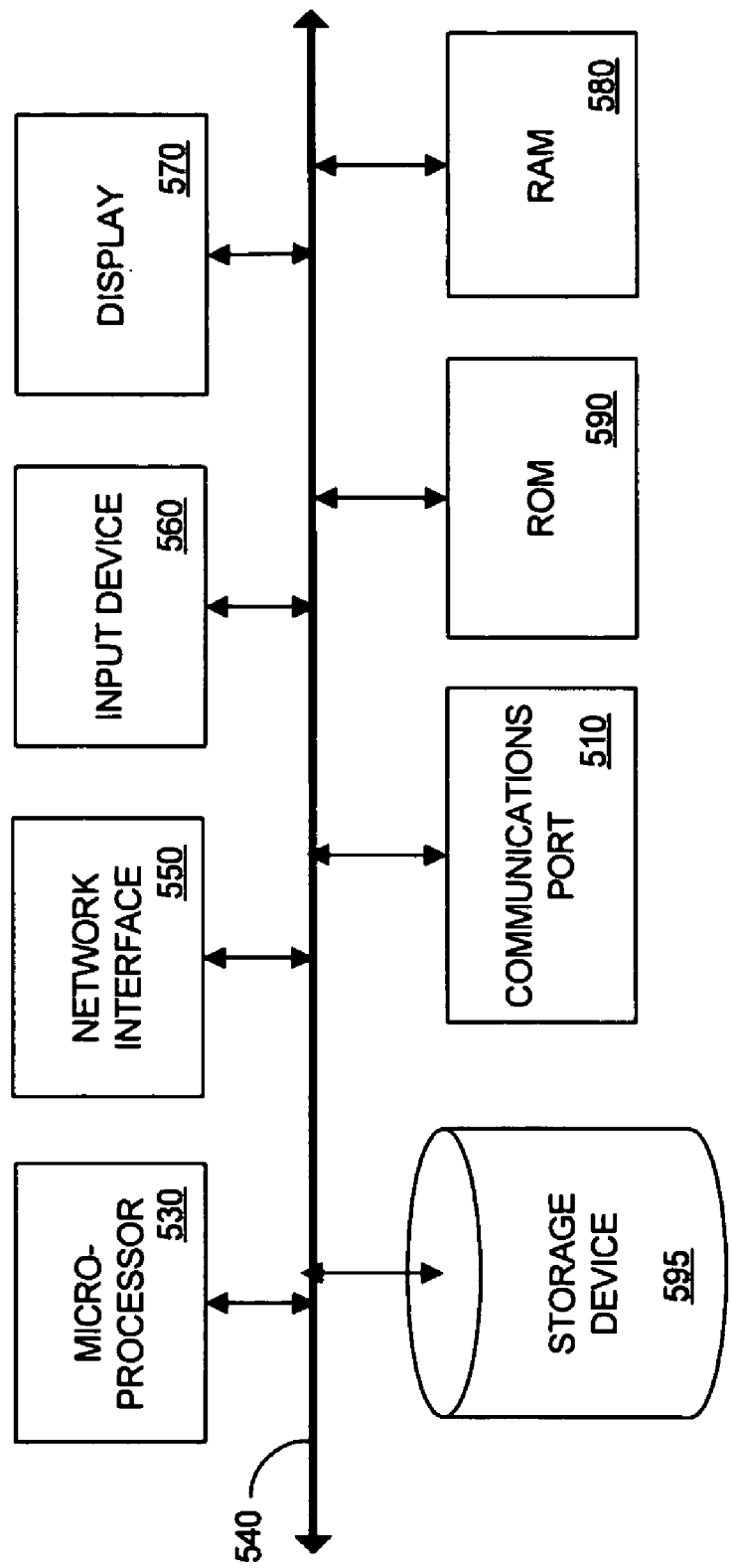
FIG. 5 is a block diagram of the internal architecture of a computing device or presenter server according to some embodiments of the invention.

FIG. 5 is a representative block diagram of computing device 10 or presenter/server 5 according to some embodiments. First, operation as computing device 10 will be described in detail, and then, operation as presenter/server 5 will be described. Many operating details in the description of elements computing device 10, below, can also be applied when those elements combine to operate as presenter/server 5.

Computing device 10 may comprise a single device or computer, a networked set or group of devices or computers, such as a workstation, laptop etc. Computing device 10 is typical of a synchronization destination which has presentation data available prior to the start of a collaboration session. Computing device 10 of FIG. 5 includes microprocessor 530 in communication with communication bus 540. Microprocessor 530 is used to execute processor-executable process steps so as to control the components computing device 10 to provide functionality according to embodiments of the present invention. Microprocessor 530 may comprise a Pentium™, or Itanium™ microprocessor manufactured by Intel Corporation. Other suitable processors may be available from Motorola, Inc., AMD, or Sun Microsystems, Inc. Microprocessor 530 also may comprise one or more microprocessors, controllers, memories, caches and the like.

Input device 560 and display 570 are also in communication with communication bus 540. Any known input device may be used as input device 560, including a keyboard, mouse, touch pad, voice-recognition system, or any combination of these devices. Input device 560 may be used by a user to input information and commands to computing device 10.

Display 570 may be an integral or separate CRT display, a flat-panel display or the like. Display 570 is generally used to output graphics and text to an operator in response to commands issued by microprocessor 530. Display 570 may display presentation data and the like which is used during the collaboration session.

RAM (Random Access Memory) 580 is connected to communication bus 540 to provide microprocessor 530 with fast data storage and retrieval. In this regard, processor-executable process steps being executed by microprocessor 530 are typically stored temporarily in RAM 580 and executed therefrom by microprocessor 530. ROM (Read Only Memory) 590, in contrast, may provide storage from which data can be retrieved but to which data cannot be stored. Accordingly, ROM 590 may be used to store invariant process steps and other data, such as basic input/output instructions and data used during system boot-up or to control input device 560. One or both of RAM 580 and ROM 590 may communicate directly with microprocessor 530 instead of over communication bus 540, or on separate dedicated busses.

Data storage device 595 stores, among other data, processor-executable process steps of personal application 250, synchronization application 240, collaboration session client applications and so on (see FIG. 2). The process steps and program code of synchronization application 240 and personal application 250 may be read from a computer-readable medium, such as a floppy disk, a CD-ROM, a DVD-ROM, a Zip™ disk, a magnetic tape, or provided as a signal from such media encoding the process steps/program code, and then stored in data storage device 595 in a raw, compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 550 which may be a wired or wireless Ethernet interface, a modem interface, and so on. In utilizing the various embodiments of the invention, the network interface 550 is assumed not to be connected to or to provide or access a high-speed connection to the Internet or an Intranet providing access to the Internet or similar networks. Without an ability to receive and send data in a high speed or high bandwidth manner, it is further assumed that the computing device 10 is therefore unable to receive presentation data in real-time over network interface 550 during the collaboration session.

It is further assumed, therefore, that a copy of the presentation data is already available locally on computing device 10 when the collaboration session has commenced. The presentation data copy may be stored on data storage 595 or read from a computer-readable medium, such as a floppy disk, a CD-ROM, a DVD-ROM, a Zip™ disk, a magnetic tape, or accessed from a connected secondary storage device such as USB hard drive and the like. The computing device 10 loads the copy of the presentation data using personal application 240 (or in connection with or as a sub-application of a collaboration client). When so instructed by synchronization commands, computing device 10 synchronizes the local copy of presentation data with a presenter/server of the collaboration session using synchronization application 250. The synchronization command is forwarded from a mobile communication device (such as mobile communication device 30 of FIG. 1) to the computing device 10 over a communications port 510. Communications port 510 is a data or signaling port/interface which allows communication with other connectable peripheral devices such as printers, scanners, modems, disk drives, PDAs, cellular telephones, input devices and so on. Communications port 510 may be at least one of or a combination of ports such as IrDA ports, serial ports, parallel ports, Bluetooth ports, USB ports and the like. Though shown as a single port, communications port 510 is merely representative of one of many such communication ports that a computing device 10 may possess. In accordance with the invention, synchronization commands and feedback are sent to and received from a mobile communication device using communications port 510. The mobile communication device will also have the same, compatible and/or interoperable interface as communications port 510 for facilitating such transfers. As mentioned above, a mobile communication capability such as CDMA or GSM may be integrated into computing device 10. In such cases, communications port 510 would not need to be used for communicating synchronization information since there would be device-internal data transfer available.

Stored in data storage device 595 may also be other elements that may be necessary for operation of computing device 10, such as other applications, other data files, a network server, an operating system, a database management system and "device drivers" for allowing microprocessor 530 to interface with external devices. These elements are known to those skilled in the art, and are therefore not described in detail herein.

FIG. 5 may also represent a presenter/server 5. In such embodiments, the presenter/server 5 is also a computing device but with a network interface 550 that does have a high speed and/or high bandwidth connection to the Internet, or an Intranet providing access to same and the like. The presenter/server 5 would use network interface 550 to send synchronization commands to and receive synchronization feedback from the mobile application server. Presenter/server 5 would also run applications such as the collaboration application 210 and secondary application 220 using program code loaded into RAM 580 and executed by microprocessor 530. Code and data for these applications as well as presentation data and the like can be stored on data storage 595 and the like.

The particular arrangements of process steps described above are not meant to imply a fixed order; embodiments can be practiced in any order that is practicable. The processes described herein may be embodied as program code developed using an object-oriented language that allows the modeling of complex systems with modular objects to create abstractions that are representative of real world, physical objects and their interrelationships. However, embodiments may be implemented in many different ways using a wide range of programming techniques as well as hardwired in hardware systems or dedicated controllers. In addition, in some embodiments, many, if not all, of the elements described above are optional or can be combined into single elements.

Any embodiments described above are not intended to be limited to the specific form set forth herein, but are intended to cover such alternatives, modifications and equivalents as can reasonably be included within the spirit and scope of the appended claims.

What is claimed is:

1. A system for a collaboration session involving a plurality of participants, said system comprising:
 a mobile communication device associated with one of said participants and connected to a presenter server identified as a master presenter, said collaboration session involving presentation data changing state at said presenter server, wherein said presentation data comprises slides and said presentation data is configured with an identification of said master presenter, a file name corresponding to said presentation data and identification of synchronization destinations, said mobile communication device configured to receive synchronization commands from said presenter server over a telecommunications network and to return synchronization commands to said presenter server over said telecommunications network, said received synchronization commands representative of a change in state of said presentation data at said presenter server; and
 a synchronization destination including a presentation device configured to receive relayed synchronization commands from said mobile communication device, each said synchronization destination having a local copy of said presentation data prior to said synchronized presentation and each participant being at one said synchronization destination, wherein said relayed synchronization commands enable synchronization at said system of the local copy of said presentation data with the presentation data at said presenter server, at least one said synchronization destination selectively returning synchronization commands through said mobile communication device to said presenter server;
 wherein said synchronization destination runs a synchronization application which utilizes said received synchronization commands from said mobile communication device to synchronize said local copy of the presentation data; and
 wherein said received synchronization commands and said returned synchronization commands include messages indicating current slide number, file name of data being presented, page numbers, mouse coordinates, and screen coordinates.

2. A system according to claim 1 wherein said received synchronization commands originate from said presenter server, said mobile communication device is a telecommunications device relaying said synchronization commands over said telecommunications network while said synchronization destination is receiving relayed commands from said telecommunication device and said presentation device is otherwise disconnected from said presenter server.

3. A system according to claim 2 further comprising:
 a mobile application server in said telecommunications network configured to communicate with said presenter server, said mobile application server relaying synchronization commands originating from said presenter server to each said telecommunications device and returning synchronization commands from said telecommunications device to said presenter server.

4. A system according to claim 2 wherein said received synchronization commands are received by said telecommunications device through said telecommunications network data channel, said telecommunications device relaying received said synchronization commands to said presentation device and returning locally originating synchronization commands to said presenter server.

5. A system according to claim 2 wherein said received synchronization commands originate at another said synchronization destination and are received from said presenter server by said telecommunications device through said telecommunications network signaling channel and said local copy is retrieved from removable local storage media.

6. A system according to claim 1 wherein said synchronization commands are sent through a data network from another said synchronization destination to said presenter server, said mobile communication device further forwarding said synchronization commands to said presentation device while said synchronization destination is connected to said presenter server.

7. A system according to claim 1 wherein said mobile communication device and said synchronization destination both include at least one port/interface over which they can communicate bidirectionally, said mobile communication device communicating received/returned said synchronization commands over said telecommunications network to/from said synchronization destination regardless of whether said presentation device is connected to said presenter server.

8. A system according to claim 7 wherein said at least one port/interface is compatible or interoperable with at least one of: Bluetooth, IrDA, Universal Serial Bus and serial standards.

9. A system according to claim 1 wherein said mobile communication device includes at least one of a cellular telephone, a satellite telephone and a PDA and the local copy is e-mailed to said presentation device prior to commencing the collaboration session.

10. A system according to claim 1 further comprising a plurality of collaboration session synchronization destinations, said synchronization destination being one of said plurality of collaboration session synchronization destinations displaying a synchronized copy, wherein said collaboration session further includes voice conferencing and video conferencing, presentation devices at said plurality of collaboration session synchronization destinations including at least one of a laptop computer, a desktop computer, a handheld computer, a PDA and a cellular telephone with browsing capability.

11. A system according to claim 1 wherein said synchronization destination selectively connects to said presenter server to receive said local copy and runs a personal application for viewing and disconnects after receiving said local copy, said presentation data being presented and synchronized with said presentation device disconnected from said presenter server, said personal application receiving said synchronization commands from said mobile communication device over said telecommunications network.

12. A system according to claim 1 wherein said mobile communication device is further configured to receive synchronization feedback from the presentation device at said at least one synchronization destination, said synchronization feedback representative of inputs from said participants to said presentation device and wherein whenever said one participant becomes a temporary presenter presenting from said local copy, changes to said local copy being returned over said telecommunications network to said presenter server for forwarding to others of said plurality of participants as synchronization commands.

13. A system for a collaboration session involving a plurality of participants, said system comprising:
a mobile communication device with capability associated with at least one of said participants and connected to a presenter server identified as a master presenter, said collaboration session involving presentation data changing state at said presenter server, wherein said presentation data comprises slides and said presentation data is configured with an identification of said master presenter, a file name corresponding to said presentation data and identification of synchronization destinations, said mobile communication capability configured to receive synchronization commands from said presenter server over a telecommunications network and to return synchronization commands to said presenter server over said telecommunications network, said received synchronization commands representative of a change in state of said presentation data at said presenter server; and
a computing device with capability integrated with said mobile communication capability in a synchronization destination, the integrated said computing capability configured to send and receive synchronization commands to and from said mobile communication capability, said synchronization destination having a local copy of said presentation data prior to said synchronized presentation, wherein said synchronization commands enable synchronization of the local copy of said presentation data with the presentation data at said presenter server responsive to received said synchronization commands from said mobile communication capability and said returned synchronization commands enable synchronization of said presentation data at said presenter server responsive to local input at said local copy;
wherein said synchronization destination runs a synchronization application which utilizes synchronization commands from said mobile communication device to synchronize said local copy of the presentation data; and
wherein said received synchronization commands and said returned synchronization commands include messages indicating current slide number, file name of data being presented, page numbers, mouse coordinates, and screen coordinates.

14. A system according to claim 13 further comprising:
a mobile application server in said telecommunications network configured to communicate with said presenter server, said mobile application server forwarding synchronization commands originating from said presenter server to each said synchronization destination through its mobile communication capability when at least one said synchronization destination is otherwise disconnected from said presenter server such that communications with said system and said presenter server are only over said telecommunications network.

15. A system according to claim 14 wherein said mobile application server is coupled to at least one wireless telecommunications network, said at least one wireless telecommunications network capable of communicating with said synchronization destination through its mobile communication capability, and said collaboration session further includes voice conferencing and video conferencing.

16. A system according to claim 14 wherein said presentation data comprises slides, synchronization commands include messages indicating current slide number, file name of data being presented, page numbers, mouse coordinates, and screen coordinates and said mobile application server is the IP Multimedia Subsystem server.

17. A system according to claim 13 wherein said synchronization commands are received by said synchronization destination using the telecommunications network data channel and said returned synchronization commands return through the telecommunications network data channel and the local copy is e-mailed to said computing device prior to commencing the collaboration session.

18. A system according to claim 13 wherein said synchronization commands are received by said synchronization destination using the telecommunications network signaling channel associated with its mobile communication capability and said returned synchronization commands return through the telecommunications network signaling channel.

19. A system according to claim 13 further comprising a plurality of collaboration session apparatus synchronization destinations, said synchronization destination being one of said plurality of collaboration session apparatus synchronization destinations, and wherein said synchronization commands are sent through a telecommunications data network and said synchronization destination selectively, separately connects to said presenter server to receive said local copy.

20. A system according to claim 13 wherein said mobile communication capability includes at least one of a cellular capability, radio frequency capability and a satellite capability.

21. A system according to claim 13 further comprising removable local storage media capability, said local copy being selectively retrieved from removable local storage media and wherein said computing capability and said mobile communication capability communicate internally within said synchronization destination.

22. A method of managing a collaboration session apparatus during a collaboration session, the method comprising:
receiving at a mobile communication device a plurality of synchronization commands for a synchronization destination, synchronization commands passing over a telecommunications network to said mobile communication device, said collaboration session apparatus including said mobile communication device and said synchronization destination, wherein presentation data comprises slides and said presentation data is configured with an identification of a master presenter, a file name corresponding to said presentation data and identification of synchronization destinations and changing state at said presenter server, said synchronization commands representing commands changing the state in said presentation data at a presenter server identified as said master presenter;
utilizing said synchronization commands presenting a local copy of said presentation data on a presentation device at said synchronization destination, synchronizing the state of said local copy to match that of the presentation data at the presenter server regardless of whether said presentation device is connected to said presenter server; and
selectively returning synchronization commands from said synchronization destination over said telecommunications network via said mobile communication device to said presenter server, said returned synchronization commands synchronizing said presentation data at the presenter server to said local copy;
wherein said synchronization destination runs a synchronization application which utilizes synchronization commands from said mobile communication device to synchronize said local copy of the presentation data; and
wherein said synchronization commands and said returned synchronization commands include messages indicating current slide number, file name of data being presented, page numbers, mouse coordinates, and screen coordinates.

23. A method according to claim 22 further comprising:
returning to the receiving step and continuing the collaboration session, said mobile communication device forwarding said synchronization commands to said synchronization destination and returning said returned synchronization commands over said telecommunications network to said presenter server.

24. A method according to claim 23 wherein said synchronization commands are forwarded by said mobile communication device to a plurality of collaboration session apparatus synchronization destinations, said synchronization destination being one of said plurality of collaboration session apparatus synchronization destinations.

25. A method according to claim 23 wherein said received synchronization commands are received over said telecommunications network by said mobile communication device via a mobile application server in said telecommunications network and said returned synchronization commands are returned to said presenter server through said mobile application server.

26. A method according to claim 25 wherein said mobile application server is coupled to at least one wireless telecommunications network, said at least one wireless telecommunications network capable of communicating with said mobile communication device, and said mobile communication device is a telecommunications device.

27. A method according to claim 25 wherein said presentation data comprises slides, synchronization commands include messages indicating current slide number, file name of data being presented, page numbers, mouse coordinates, and screen coordinates and said mobile application server is the IP Multimedia Subsystem server.

28. A method according to claim 23 wherein said mobile communication device includes at least one of a cellular telephone, a satellite telephone and a PDA, and said collaboration session further includes voice conferencing and video conferencing.

29. A method according to claim 23 further comprising:
receiving at said mobile communication device at least one synchronization feedback from said synchronization destination, said synchronization feedback being commands returned over said telecommunications network as said returned synchronization commands and representing inputs by said participants to said synchronization destination.

30. A method according to claim 29, the selectively returning step comprising:
collecting said synchronization feedback on said synchronization destination; and
sending said synchronization feedback from said synchronization destination to said mobile communication device.

31. A method according to claim 29, wherein said mobile communication device is a mobile telecommunications device, the selectively returning step further comprising:
sending said synchronization feedback from said mobile telecommunications device over said telecommunications network to a mobile application server; and
forwarding said synchronization feedback from said mobile application server over said telecommunications network to said presenter server.

32. A method according to claim 29 wherein said mobile communication device includes at least one of a cellular telephone, a satellite telephone and a PDA.

33. A method according to claim 31 wherein said mobile application server is coupled to at least one wireless telecommunications network, said at least one wireless telecommunications network capable of communicating with said mobile telecommunications device.

34. A method according to claim 31 further comprising said synchronization destination selectively, separately connecting to said presenter server to download said local copy and disconnecting before receiving said synchronization commands and wherein said mobile application server is the IP Multimedia Subsystem server.

35. A method according to claim 22 further comprising:
receiving over said telecommunications network said synchronization commands at a mobile communication capability, said mobile communication capability integrated into said synchronization destination.

36. A method according to claim 35 wherein said synchronization commands are received by said mobile communication capability via a mobile application server in said telecommunications network.

37. A method according to claim 36 wherein said mobile application server is coupled to at least one wireless telecommunications network, said at least one wireless telecommunications network capable of communicating with said mobile communication device.

38. A method according to claim 36 wherein said mobile application server is the IP Multimedia Subsystem server and the local copy is e-mailed to said computing device prior to commencing the collaboration session.

39. A method according to claim 35 wherein said mobile communication capability includes at least one of a cellular capability, a radio frequency capability, and a satellite capability.

40. A method according to claim 35 wherein said synchronization destination includes a computing device capability and said method further comprises selectively loading said local copy from removable local storage media in said computing device capability before receiving said synchronization commands over said telecommunications network.

41. A method according to claim 35 further comprising:
receiving at said mobile communication device at least one synchronization feedback from said synchronization destination, said synchronization feedback representing commands input by said participants to said synchronization destination and returned as said returned synchronization commands in said selectively returning step.

42. A method according to claim 41, the selectively returning step comprising:
collecting said synchronization feedback on said synchronization destination; and
sending said synchronization feedback from said synchronization destination to said mobile communication device.

43. A method according to claim 42, the selectively returning step further comprising:
sending said synchronization feedback from said mobile communication device over said telecommunications network to a mobile application server in said telecommunications network; and
forwarding said synchronization feedback from said mobile application server to said presenter server.

44. A method according to claim 43 wherein said mobile application server is coupled to at least one wireless telecommunications network, said at least one wireless telecommunications network capable of communicating with said mobile communication device.

45. A method according to claim 43 wherein said mobile application server is the IP Multimedia Subsystem (IPMS) server and the presenter server forwards said synchronization feedback from said IPMS server over said telecommunications network to other mobile communication devices at synchronization destinations.

46. A method according to claim 41 wherein said mobile communication device includes at least one of a cellular telephone, a satellite telephone and a PDA.

47. A method according to claim 22 wherein said synchronization destination includes at least one of a laptop computer, a desktop computer, a handheld computer, a PDA and a cellular telephone with browsing capability and the local copy is e-mailed to said computing device prior to commencing the collaboration session.

48. An apparatus for conducting collaboration sessions, said apparatus comprising a non-transitory computer-readable medium having instructions stored thereon which when executed cause:
receiving from a mobile telecommunications device at a collaboration session apparatus a plurality of synchronization commands forwarded to a synchronization destination from a presenter server identified as said master presenter, said collaboration session apparatus including said mobile telecommunications device and a presentation device at said synchronization destination, wherein presentation data comprises slides and said presentation data is configured with an identification of a master presenter, a file name corresponding to said presentation data and identification of synchronization destinations and changing state at said presenter server, said synchronization commands representing commands changing states of said presentation data at said presenter server;
utilizing said synchronization commands on a local copy of said presentation data on said presentation device at said synchronization destination, synchronizing the state of said local copy to match that of the presentation data at the presenter server regardless of whether said presentation device is connected to said presenter server;
selectively returning synchronization commands from said synchronization destination to said presenter server via said mobile communication device, said returned synchronization commands synchronizing said presentation data at the presenter server to local input at said local copy; and
resuming receiving synchronization commands for said synchronization destination until the collaboration session has ended;
wherein said synchronization destination runs a synchronization application which utilizes synchronization commands from said mobile communication device to synchronize said local copy of the presentation data; and
wherein said synchronization commands and said returned synchronization commands include messages indicating current slide number, file name of data being presented, page numbers, mouse coordinates, and screen coordinates.

49. An apparatus according to claim 48 further causing:
receiving said received synchronization commands at said mobile telecommunications device and returning said returned synchronization commands to said presenter server.

50. An apparatus according to claim 49 further causing:
forwarding of said synchronization commands by said mobile telecommunications device to a plurality of collaboration session apparatus synchronization destinations, said synchronization destination being one of said plurality of collaboration session apparatus synchronization destinations.

51. An apparatus according to claim 49 further causing:
receiving of said synchronization commands at said mobile telecommunications device via a mobile application server.

52. An apparatus according to claim 51 wherein said mobile application server is coupled to at least one wireless telecommunications network, said at least one wireless telecommunications network capable of communicating with said mobile telecommunications device.

53. An apparatus according to claim 52 further causing:
selectively, separately connecting said synchronization destination to said presenter server; and
downloading said local copy, and wherein said mobile application server is the IP Multimedia Subsystem server in said at least one wireless telecommunications network.

54. An apparatus according to claim 49 wherein said mobile telecommunications device includes at least one of a cellular telephone, a satellite telephone and a PDA.

55. An apparatus according to claim 49 selectively returning comprising:
receiving at said mobile telecommunications device at least one synchronization feedback from said synchronization destination, said synchronization feedback representing commands input by said participants to said presentation device and being returned as said returned synchronization commands.

56. An apparatus according to claim 55 selectively returning further comprising:
collecting said synchronization feedback on said synchronization destination; and
sending said synchronization feedback from said synchronization destination to said mobile telecommunications device.

57. An apparatus according to claim 55, selectively returning further comprising:
sending said synchronization feedback from said mobile telecommunications device to a mobile application server; and
forwarding said synchronization feedback from said mobile application server to said presenter server.

58. An apparatus according to claim 57 wherein said mobile application server is coupled to at least one wireless telecommunications network, said at least one wireless telecommunications network capable of communicating with said mobile telecommunications device.

59. An apparatus according to claim 57 wherein said mobile application server is the IP Multimedia Subsystem (IPMS) server and the presenter server forwards said synchronization feedback from said IPMS server to other mobile telecommunications devices at synchronization destinations.

60. An apparatus according to claim 55 wherein said presentation data comprises slides, synchronization commands include messages indicating current slide number, file name of data being presented, page numbers, mouse coordinates, and screen coordinates and said mobile telecommunications device includes at least one of a cellular telephone, a satellite telephone and a PDA.

61. An apparatus according to claim 48 further causing:
receiving said synchronization commands at a mobile communication capability, said mobile communication capability integrated with said presentation device into said synchronization destination as said mobile telecommunications device.

62. An apparatus according to claim 61 wherein said synchronization commands are received by said mobile communication capability via a mobile application server.

63. An apparatus according to claim 62 wherein said mobile application server is coupled to at least one wireless telecommunications network, said at least one wireless telecommunications network capable of communicating with said mobile telecommunications capability of said synchronization destination.

64. An apparatus according to claim 62 wherein said mobile application server is the IP Multimedia Subsystem (IPMS) server further receiving said returned synchronization commands and forwarding received said returned synchronization commands as synchronization feedback to said presenter server, the presenter server forwarding said synchronization feedback from said IPMS server over said at least one wireless telecommunications network to other mobile telecommunications devices at synchronization destinations.

65. An apparatus according to claim 62 wherein said mobile communication capability includes at least one of a cellular capability, a radio frequency capability, and a satellite capability, and said collaboration session further includes voice conferencing and video conferencing.

66. An apparatus according to claim 61 wherein said presentation device is a computing device capability and said apparatus further causes selectively loading said local copy from removable local storage media in said computing device capability before receiving said synchronization commands.

67. An apparatus according to claim 61 selectively returning comprising:
receiving at said mobile telecommunications device at least one synchronization feedback from said synchronization destination, said synchronization feedback representing commands input by said participants to said synchronization destination and being returned as said returned synchronization commands.

68. An apparatus according to claim 67 selectively returning further comprising:
collecting said synchronization feedback on said synchronization destination; and
sending said synchronization feedback from said synchronization destination to said mobile telecommunications device.

69. An apparatus according to claim 68 selectively returning further comprising:
sending said synchronization feedback from said mobile telecommunications device to a mobile application server; and
forwarding said synchronization feedback from said mobile application server to said presenter server.

70. An apparatus according to claim 69 wherein said mobile application server is coupled to at least one wireless telecommunications network, said at least one wireless telecommunications network capable of communicating with said mobile telecommunications device.

71. An apparatus according to claim 69 wherein said mobile application server is the IP Multimedia Subsystem server.

72. An apparatus according to claim 67 wherein said mobile communication device includes at least one of a cellular telephone, a satellite telephone and a PDA.

73. An apparatus according to claim 48 wherein said synchronization destination includes at least one of a laptop computer, a desktop computer, a handheld computer, a PDA and a cellular telephone with browsing capability.

* * * * *